Nov. 28, 1933.  M. BUCHHOLZ  1,936,707

METHOD OF PROTECTING ELECTRICAL APPARATUS

Filed June 28, 1928

Inventor:
Max Buchholz
by
Atty.

Patented Nov. 28, 1933

1,936,707

UNITED STATES PATENT OFFICE 1,936,707

METHOD OF PROTECTING ELECTRICAL APPARATUS

Max Buchholz, Cassel, Germany

Application June 28, 1928, Serial No. 289,065, and in Germany June 30, 1927

4 Claims. (Cl. 175—294)

My invention relates to a method of protecting electrical apparatus, such as transformers, switches, motors, generators, and the like. It is an object of my invention to provide means for interrupting the supply of electrical energy to the apparatus to be protected, either by warning the attendant or by actuating automatic cutouts or the like, whenever such products of decomposition are developed. To this end I cause the gaseous or other foreign matter to influence the passage of heat rays from a source of heat in such manner that the physical condition of a heat absorber is altered upon the interference of such foreign matter and suitable means for protecting the apparatus is rendered active by such alteration.

In other words, my invention comprises utilizing the difference in the capacity of impure air or other gas for absorbing or deviating heat rays, as compared with pure air or gas, causing the air or gas to pass between a source of heat rays and a device sensitive to heat and normally acted upon or, on the contrary, protected against the action of the heat rays emitted by said source. Obviously, if impurities are mixed to the air or gas flowing across the path between the heat responsive device and the source of heat, the variation of heat absorbing or deflecting capacity of such air or gas will influence the said heat responsive device and this may be utilized to operate an indicator of some suitable kind as a measuring instrument, a protective device, a circuit containing such protective device, or some other means for some useful purposes.

In the drawing affixed to this specification and forming part thereof several arrangements embodying my invention are illustrated diagrammatically by way of example.

Figure 1:
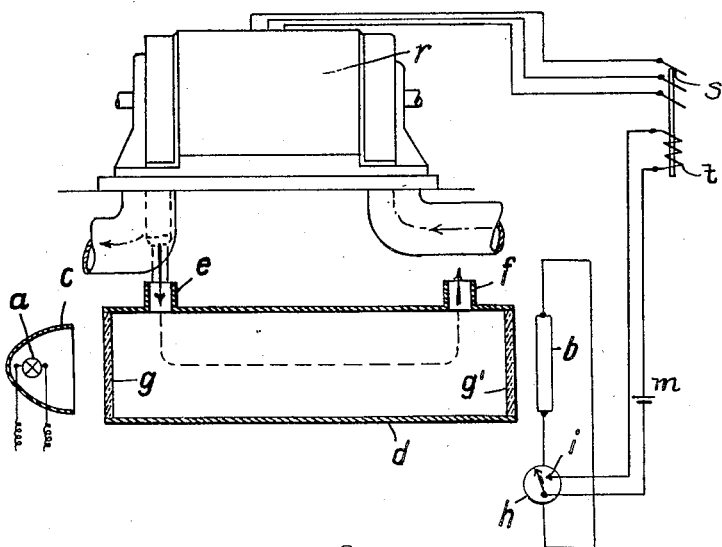
Fig. 1 is a longitudinal axial section of the simplest form with a heat responsive device inserted in a protective circuit.

Referring first to Fig. 1, a is a source of heat, which may for instance be formed of an electrically heated silit rod, a resistance wire, an incandescent lamp, a Bunsen burner or the like. b is the heat responsive device whose physical characteristic is influenced by variations in the irradiation with heat rays, for instance the length or thickness of the device being changed in consequence of such variations. In Fig. 1 the device is shown as being formed as an electrical resistance, a thermo couple or the like. A reflector c placed to the rear of the source of heat serves for concentrating the heat rays, but a collector lens may be employed in its stead. Between the source of heat and the heat responsive device is arranged a guide tube for the air or other gas to be observed, which is either introduced at one end and escapes at the other end, or the ends of the tube may be closed by plates, such as g and g', permeable to heat rays, and in that gas branch tubes such as e and f may be provided for the gas introduction and exhaust.

These tubes are here shown to be traversed by part of the current of cooling air passing through the dynamo r. A cut-out switch s controlling the operation of the dynamo is operatively connected with a solenoid t inserted in the circuit of the heat responsive device which includes a source of current m.

When in the generator to be protected, vapors or gaseous products are formed in consequence of abnormal conditions of operation, they will be carried along by the cooling air and part of the mixture of cooling air and gases or vapors will enter the branch tube e and pass through the tube d in the direction of the arrow, so that the heat rays emitted from a now pass through the mixture of air and gas filling the tube before meeting the heat responsive device. The gases or vapors admixed to the air in the tube d having a greater or smaller heat absorbing capacity than the air or gas normally filling the tube, a smaller or greater quantity of heat will be transmitted to the heat responsive device b and the physical characteristic of this device will be changed accordingly.

If a thermo-couple is provided at b, its electromotive force will be changed and this change will cause the contact i of a contact device h to be closed, whereby the circuit of the solenoid s is closed and the solenoid is operated to open the switch and cut out the dynamo.

Instead of the switch an acoustic or optical signal, an alarm or the like may be provided.

If the thermo-couple is replaced by an electrical resistance, any change in heat radiation will be accompanied by a change in temperature of the resistance, whereby the resistance value and the current passing through the resistance will be changed accordingly.

Figure 2:
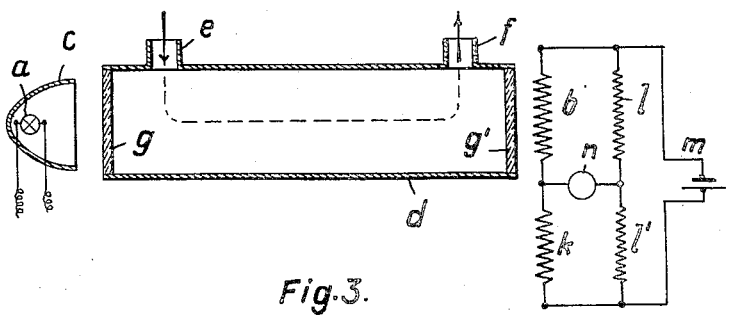
Fig. 2 is a similar view of a second form embodying a Wheatstone bridge connection, and Fig. 3 discloses in a like manner an arrangement operating on the differential principle.

Another means for paralyzing the influence of the changes of temperature of the ambient air is illustrated in Fig. 2, where two resistances are arranged in bridge connection, only one of them being influenced by the heat rays. Here the heat responsive device consists of two equal resistances $b$ and $k$, connected with two resistances $l$, $l'$ of equal value to form a Wheatstone bridge supplied with current from a source $m$. A contact device $n$ is shunted in the bridge, through which no current flows whatever the room temperature might be or the voltage of the source of current, until abnormal gases, vapours or fumes enter the path of the heat rays in tube $d$, which will at once disturb the equilibrium of the bridge connection by changing the resistance in $b$.

Figure 3:
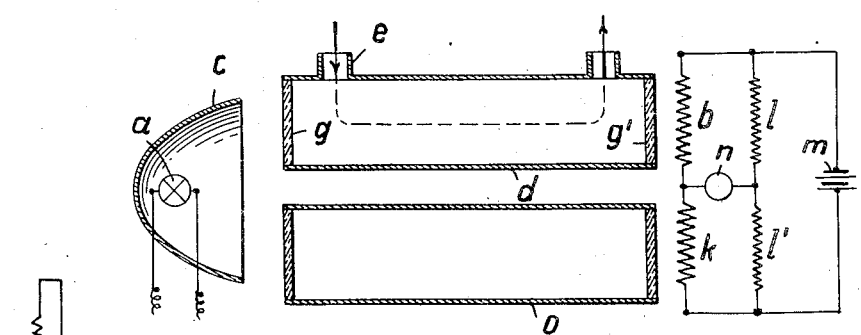
Figure 1A:
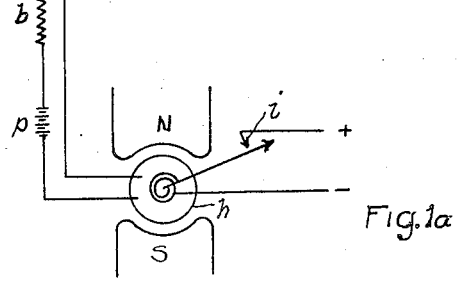
Fig. 1a shows a detail of the trip relay circuit shown in Fig. 1.

In the arrangement shown in Fig. 3 the variations of intensity of the source of heat are eliminated since the source emitting heat rays not only passes across tube $d$ to affect the resistance $b$, but also across a second tube $o$ onto resistance $k$, the second tube $o$ being, however, closed so that no abnormal gases, vapours or fumes can enter. Obviously as long as no such matter enters tube $d$, the equilibrium in the bridge connection will not be disturbed, even if the intensity of the source of heat should vary, and the instrument $n$ will operate only if tube $d$ is traversed by abnormal gases, vapours or fumes.

In all these and other arrangements the intensity of reaction will depend on the length of tube $d$. If the heat rays cannot be conducted in a straight pass, they may be deflected by means of mirrors or prisms.

The resistances $l$ and $l'$ may be equal to $b$ and $k$ and, if desired, may also be exposed to the action of the heat rays.

In certain cases either the tube $d$ or $o$ or both might also be dispensed with, the air or gas in pure state or laden with abnormal gases, vapours or fumes traveling freely across the gap separating the source of heat from the heat responsive device.

I wish it to be understood that I do not desire to be limited to the exact details of construction shown and described for obvious modifications will occur to a person skilled in the art.

I claim:

1. In combination with an electrical translating device, means supplying cooling gases to said device and means withdrawing the same after they have passed through said device, a source of heat radiation, heat detecting means positioned in the path of heat radiation, means for withdrawing some of the cooling gases after they have passed through the device and passing them through said path between the heat radiation means and the heat detecting means, and electric switching means operated by said detecting means by the variation of the heat detected for ceasing the operation of said electrical translating device.

2. In combination with an electrical translating device, means supplying cooling gases to said device and means withdrawing the same after they have passed through said device, a source of heat radiation, heat detecting means positioned in the path of the heat radiation, means for withdrawing some of the cooling gases after they have passed through the device and passing them through said path between the heat radiation means and the heat detecting means, electrical relay means operated directly by said detecting means, and means operated by said relay for ceasing the operation of said electrical translating device.

3. In combination with an electrical translating device, means supplying cooling gases to said device and means withdrawing the same after they have passed through said device, a source of heat radiation, heat detecting means positioned in the path of the heat radiation, means for withdrawing some of the cooling gases after they have passed through the device and passing them through said path between the heat radiation means and the heat detecting means, and means operated by said detecting means for ceasing the operation of said electrical translating device.

4. In combination with an electrical translating device, means supplying cooling gases to said device and means withdrawing the same after they have passed through said device, a source of heat radiation, heat detecting means positioned in the path of the heat radiation, means for withdrawing some of the cooling gases after they have passed through the device and passing them through said path between the heat radiation means and the heat detecting means, protective means and means operated by the heat detecting means for operating said protective means.

MAX BUCHHOLZ.